(12) United States Patent
Yamaoka et al.

(10) Patent No.: US 11,321,143 B2
(45) Date of Patent: May 3, 2022

(54) INFORMATION PROCESSING DEVICE AND DISTRIBUTED SYSTEM

(71) Applicant: FUJITSU LIMITED, Kawasaki (JP)

(72) Inventors: Hisatoshi Yamaoka, Kawasaki (JP);
Yasuhiko Kanemasa, Kawasaki (JP);
Miwa Okabayashi, Sagamihara (JP);
Riichiro Take, Setagaya (JP); Gaku Nakagawa, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 77 days.

(21) Appl. No.: 16/268,875

(22) Filed: Feb. 6, 2019

(65) Prior Publication Data

US 2019/0250961 A1 Aug. 15, 2019

(30) Foreign Application Priority Data

Feb. 9, 2018 (JP) .............................. JP2018-022431

(51) Int. Cl.
*G06F 9/50* (2006.01)
*G06F 11/34* (2006.01)
*G06F 11/30* (2006.01)
*G06F 11/00* (2006.01)

(52) U.S. Cl.
CPC .......... *G06F 9/5083* (2013.01); *G06F 11/008* (2013.01); *G06F 11/3006* (2013.01); *G06F 11/3433* (2013.01); *G06F 2201/81* (2013.01)

(58) Field of Classification Search
None
See application file for complete search history.

(56) References Cited

U.S. PATENT DOCUMENTS

| 8,429,282 | B1 * | 4/2013 | Ahuja | .................... H04L 47/19 709/229 |
| 2017/0017521 | A1 * | 1/2017 | Gupta | ................... G06F 9/4881 |
| 2017/0286088 | A1 * | 10/2017 | Litvinsky | .............. G06F 3/0611 |
| 2018/0137188 | A1 * | 5/2018 | Gong | .................. H04L 67/1095 |
| 2018/0212428 | A1 * | 7/2018 | Niemi | ............... H02J 13/00004 |
| 2019/0129760 | A1 * | 5/2019 | Nakano | ................... G06F 9/505 |

FOREIGN PATENT DOCUMENTS

JP 07-129510 5/1995

* cited by examiner

*Primary Examiner* — Wynuel S Aquino
(74) *Attorney, Agent, or Firm* — Fujitsu Patent Center

(57) ABSTRACT

An information processing device includes a processor configured to observe an actual load measurement value of each of change target components that have a dependency relationship with each other from among a plurality of components arranged in a distributed processing system. The processor is configured to calculate a load prediction value until completion of a change processing of all of the change target components based on the actual load measurement value of each of the change target components. The processor is configured to adjust a transmission interval of a change instruction for instructing start of the change processing to each unchanged change target component that has not started the change processing when the load prediction value exceeds a predetermined threshold value. The processor is configured to transmit the change instruction to each unchanged change target component that has not started the change processing at the adjusted transmission interval.

16 Claims, 13 Drawing Sheets

INFORMATION PROCESSING DEVICE AND DISTRIBUTED SYSTEM

CROSS-REFERENCE TO RELATED APPLICATION

This application is based upon and claims the benefit of priority of the prior Japanese Patent Application No. 2018-022431, filed on Feb. 9, 2018, the entire contents of which are incorporated herein by reference.

FIELD

The embodiments discussed herein are related to an information processing device and a distributed system.

BACKGROUND

As a utilization of the Internet of Thing (IoT) in manufacturing, distribution, and the like, a "digital twin" is expected to reproduce a state of things such as people and devices in the real world on a digital basis in real time. In order to process a large amount of data such as people or things reproduced on the digital, for example, a distributed processing system becomes important in which a processing is distributed by using a plurality of components rather than a centralized processing at a single location. FIG. 18 is an explanatory view illustrating an example of a component dependency relationship. In the distributed processing system illustrated in FIG. 18, for example, since the processing result of a dependency source component 200B among the plurality of components depends on the processing result of a dependency destination component 200A, there is a dependency relationship between these components.

Related techniques are disclosed in, for example, Japanese Laid-open Patent Publication No. 07-129510.

SUMMARY

According to an aspect of the present invention, provided is an information processing device including a memory and a processor coupled to the memory. The processor is configured to observe an actual load measurement value of each of change target components that have a dependency relationship with each other from among a plurality of components arranged in a distributed processing system. The processor is configured to calculate a load prediction value until completion of a change processing of all of the change target components based on the actual load measurement value of each of the change target components. The processor is configured to adjust a transmission interval of a change instruction for instructing start of the change processing to each unchanged change target component that has not started the change processing when the load prediction value exceeds a predetermined threshold value. The processor is configured to transmit the change instruction to each unchanged change target component that has not started the change processing at the adjusted transmission interval.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the distributed processing system, the processing content of the operating component changes, and a control is executed to change the processing content of the relevant component. However, in the distributed processing system, since there is a dependency relationship between the components, for example, in a case where the processing content of the dependency destination component being operated changes, a load may be concentrated on the dependency source component that aggregates the processing result of the dependency destination component. Therefore, it is required to suppress the load fluctuation related to the change processing even during operation.

Hereinafter, embodiments of the information processing device and the like described in the present disclosure will be explained in detail with reference to the accompanying drawings. Here, the disclosed technology is not limited by the embodiments. In addition, the following embodiments may be appropriately combined within a range that does not cause contradiction.

EMBODIMENTS

Figure 1:
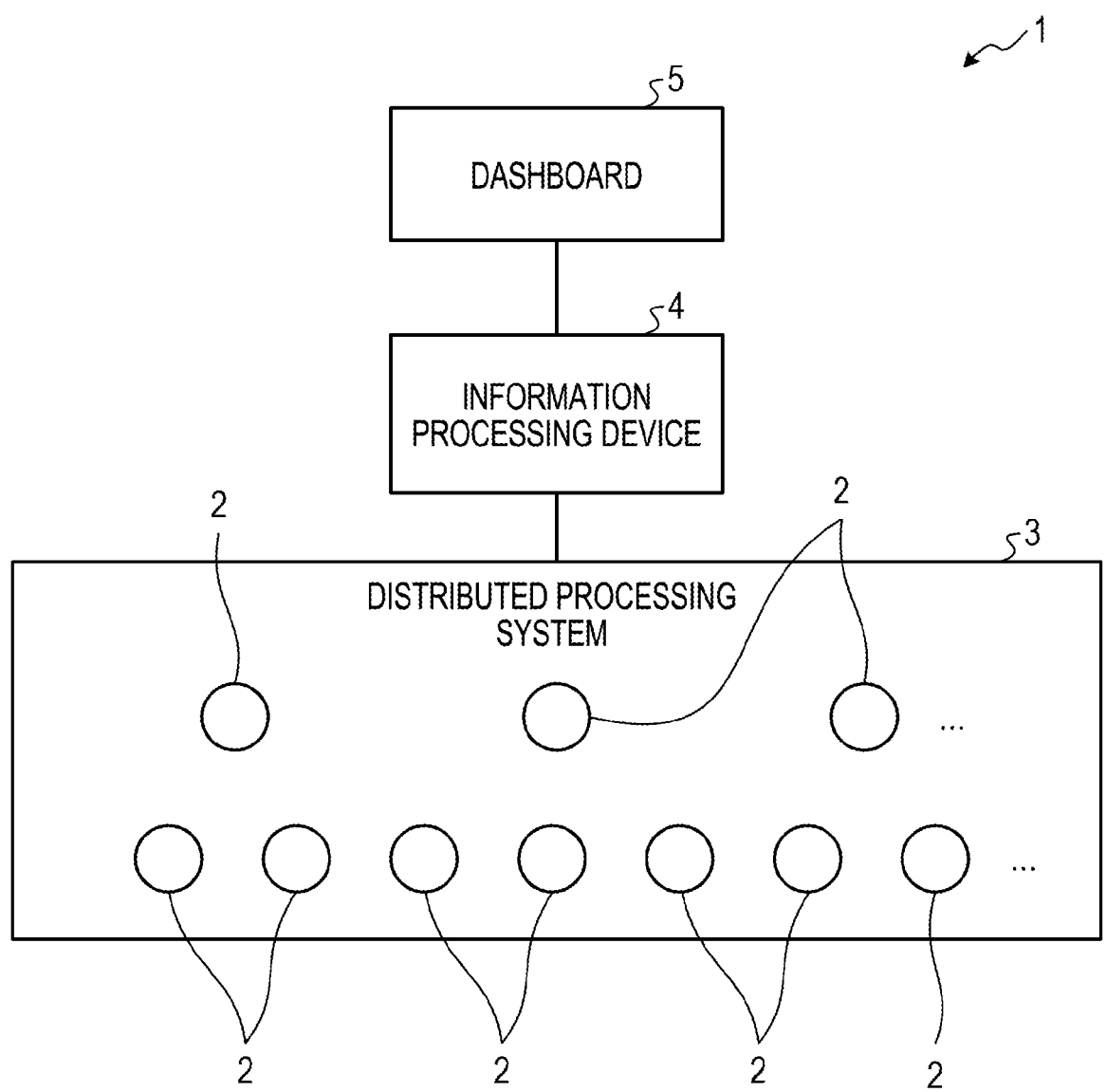
FIG. 1 is an explanatory diagram illustrating an example of a distributed system according to the present embodiment.

FIG. 1 is an explanatory view illustrating an example of a distributed system 1 according to the present embodiment. The distributed system 1 illustrated in FIG. 1 includes a distributed processing system 3 in which a plurality of components 2 are arranged, an information processing device 4 that manages each component 2 in the distributed processing system 3, and a dashboard 5 in which an operation manager manages a situation of the distributed processing system 3. Each component 2 in the distributed processing system 3 distributes various processings to each component 2 in a dependency relationship by communicating with each other so as to implement various services. The dashboard 5 includes, for example, a display unit that is connected to the information processing device 4 and displays various types of information from the information processing device 4, and an operation unit that inputs various instructions such as a change operation to the information processing device 4. The operation manager executes a change operation to change the processing of the component 2 in the distributed processing system 3 while viewing, for example, the display content of the display unit of the dashboard 5.

Figure 2:
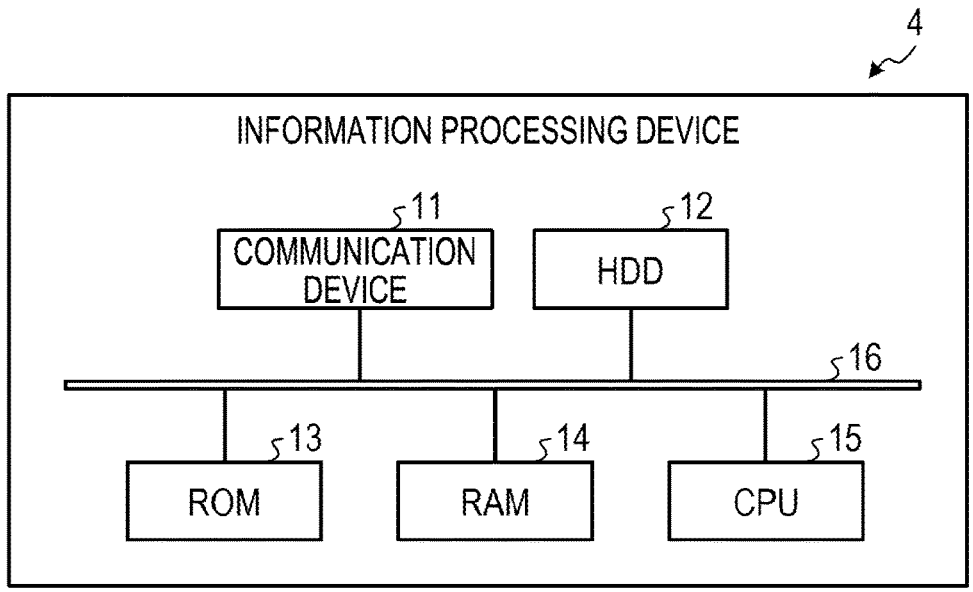
FIG. 2 is an explanatory view illustrating an example of a hardware configuration of an information processing device.

FIG. 2 is an explanatory view illustrating an example of a hardware configuration of the information processing device 4. The information processing device 4 illustrated in FIG. 2 includes a communication device 11, a hard disk drive (HDD) 12, a read only memory (ROM) 13, a random access memory (RAM) 14, a central processing unit (CPU) 15, and a bus 16. The communication device 11 is, for example, a device that establishes a communication connection with each component 2 in the distributed processing system 3. The HDD 12 is a storage area that stores various types of information. The ROM 13 is a storage area that stores information such as various programs. The RAM 14 is a storage area that stores various types of information. The CPU 15 controls the entire information processing device 4. The bus 16 is a communication line that transmits and receives data to and from the communication device 11, the HDD 12, the ROM 13, the RAM 14, and the CPU 15.

Figure 3:
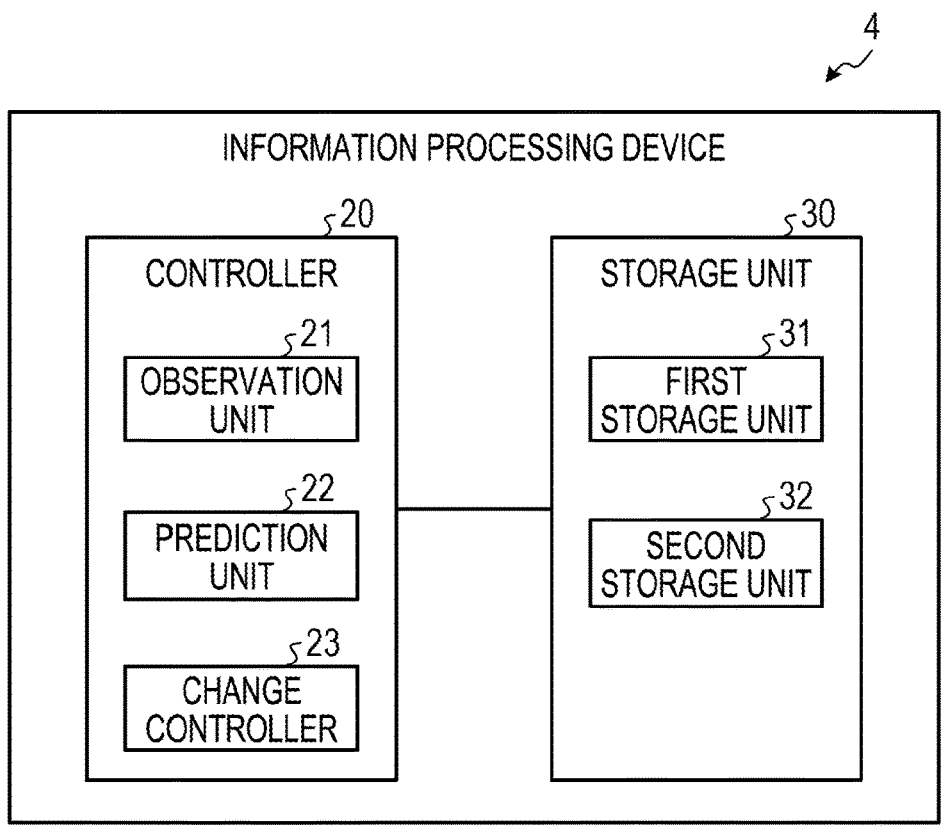
FIG. 3 is an explanatory view illustrating an example of a functional configuration of the information processing device.

FIG. 3 is an explanatory view illustrating an example of a functional configuration of the information processing device 4. The information processing device illustrated in FIG. 3 includes a controller 20 and a storage unit 30. The controller 20 corresponds to, for example, the CPU 15. The controller 20 loads the change control program stored in the ROM 13 onto the RAM 14 to execute the change control program loaded onto the RAM 14 as a change control processing, and executes, for example, an observation unit 21, a prediction unit 22, and a change controller 23 as a function. The storage unit 30 corresponds to, for example, the HDD 12, the ROM 13, and the RAM 14. The storage unit 30 includes a first storage unit 31 and a second storage unit 32. The first storage unit 31 is, for example, an area that stores observation definition information for each change operation (to be described later). The second storage unit 32 is, for example, an area that stores the transition of the load prediction value for each change operation (to be described later).

Figure 4:
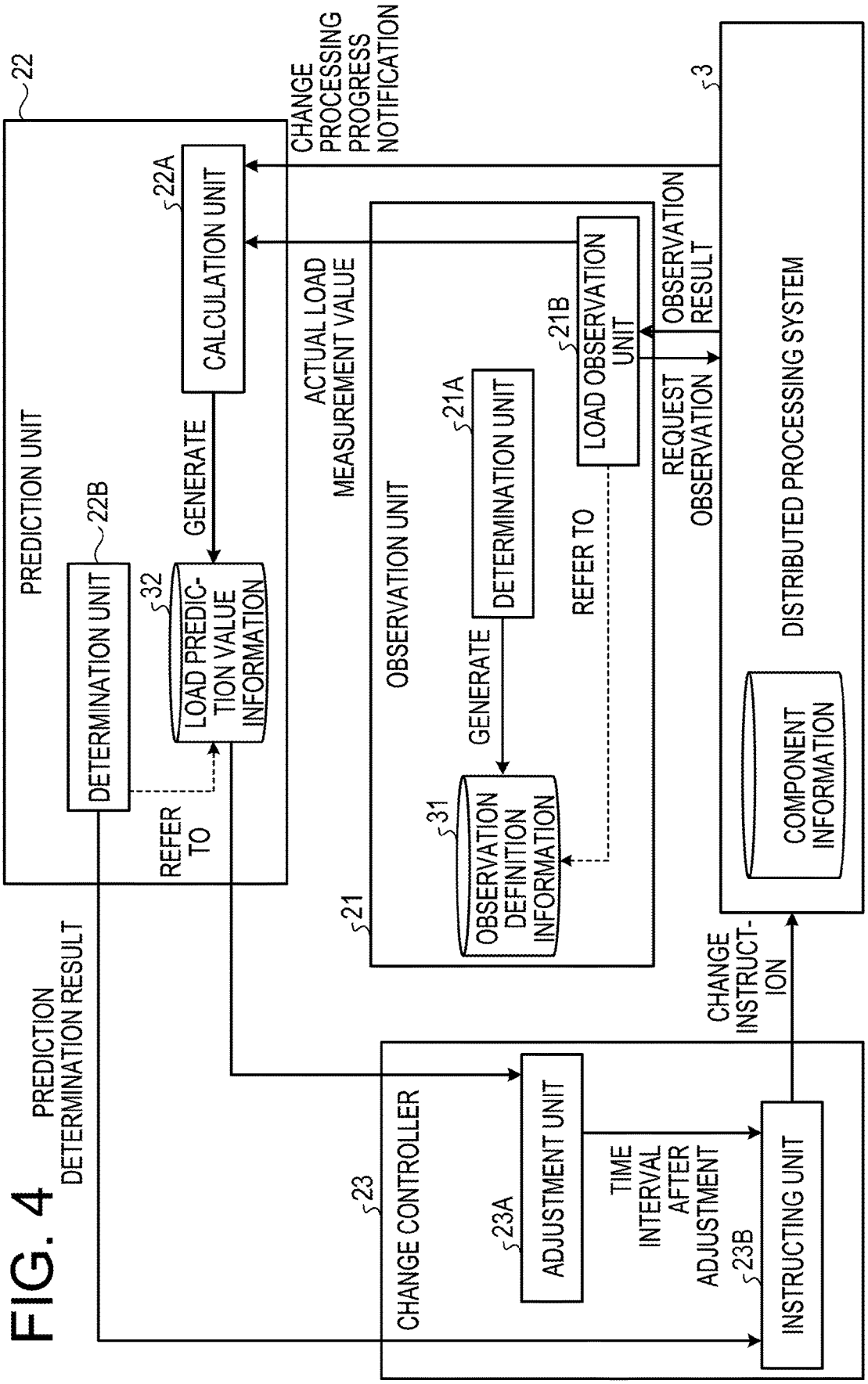
FIG. 4 is an explanatory view illustrating a detailed example of the functional configuration of the information processing device.
Figure 5:
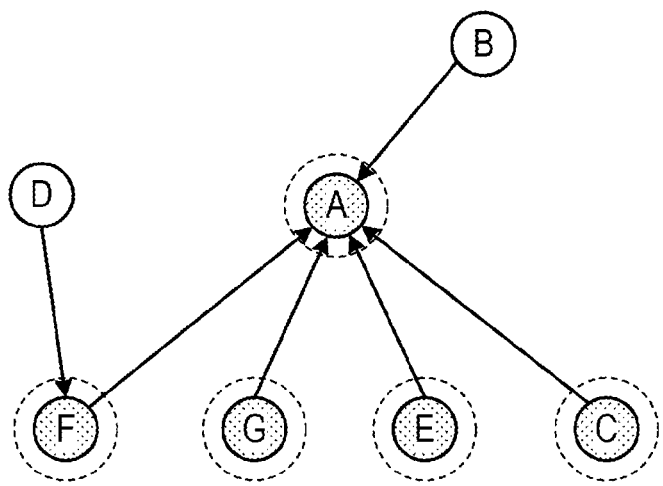
FIG. 5 is an explanatory view illustrating an example of a dependency relationship of the components in a distributed processing system.

FIG. 4 is an explanatory view illustrating a detailed example of the functional configuration in the information processing device 4. The observation unit 21 illustrated in FIG. 4 includes a determination unit 21A and a load observation unit 21B. The determination unit 21A identifies a change target component as the component 2 to be changed corresponding to the change operation on the distributed processing system 3 based on the content of the change processing corresponding to the change operation and the dependency information. FIG. 5 is an explanatory view illustrating an example of a dependency relationship of each component 2 in the distributed processing system 3. The distributed processing system 3 illustrated in FIG. 5 is in a dependency relationship in which the processing result of a component "A" depends on the processing results of components "B", "C", "E", "F", and "G". In this case, the component "A" is a dependency source component, and the components "B", "C", "E", "F", and "G" are dependency destination components. Further, the dependency information is information that indicates a logical connection relationship of each component 2 arranged in the distributed processing system 3, indicates the relationship of the component 2 whose load fluctuates with the change processing, and indicates the dependency relationship managed by the distributed processing system 3. The determination unit 21A identifies the dependency source component from the change target component. In addition, the dependency source component is a component affected by the processing result of the change target component.

The determination unit 21A generates observation definition information including dependency information, a change target component, a dependency source component, and an observation period for each change operation, and stores the observation definition information for each change operation in the first storage unit 31. The observation definition information includes, for example, a list of observation target components, an observation period when observing the observation target component, a function when the load varies with the lapse of time from the start of the change processing, and a termination condition at the time of terminating the load observation. Further, the termination condition is, for example, a case where all the change processings have been completed for the change target components, a case where a certain time has elapsed, or a case where the load variation amount is equal to or less than a predetermined value, or the like.

Based on the observation definition information, the load observation unit 21B uses the change target component in the distributed processing system 3 as the observation target component and notifies the observation target component of an observation request. The distributed processing system 3 launches an observation application programming interface (API) in response to the observation request and measures the load value of the observation target component through the observation API. The load value is load information such as the operation rate of the CPU, the usage amount of a memory, or the like that is used by the observation target component. The observation API notifies the load observation unit 21B of the load value of the observation target component as an actual load measurement value. The load observation unit 21B receives the actual load measurement value of the observation target component from the observation API. When receiving the actual load measurement value, the load observation unit 21B notifies the prediction unit 22 of the actual load measurement value.

Figure 6:
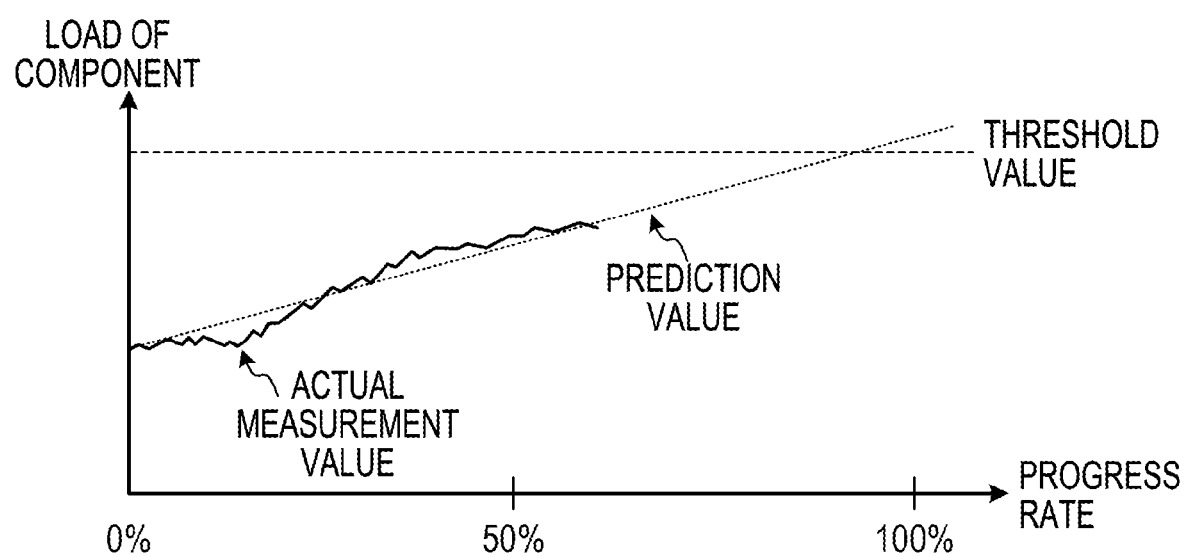
FIG. 6 is an explanatory view illustrating an example of a transition depending on a progress rate of a load prediction value.

The prediction unit 22 includes a calculation unit 22A and a determination unit 22B. When receiving the actual load measurement value of each observation target component received from the observation unit 21, the calculation unit 22A calculates an estimated load value until the progress rate reaches 100% from the actual load measurement value of the current progress rate based on the progress rate of the current change processing. FIG. 6 is an explanatory view illustrating an example of a transition depending on the progress rate of the load prediction value. The load prediction value is a transition of the load value until the progress rate reaches 100% from the current progress rate. The calculation unit 22A may use a time series prediction method such as, for example, a linear approximation method or a least square method. The calculation unit 22A stores the transition of the load prediction value until the progress rate reaches 100% in the second storage unit 32.

Figure 7:
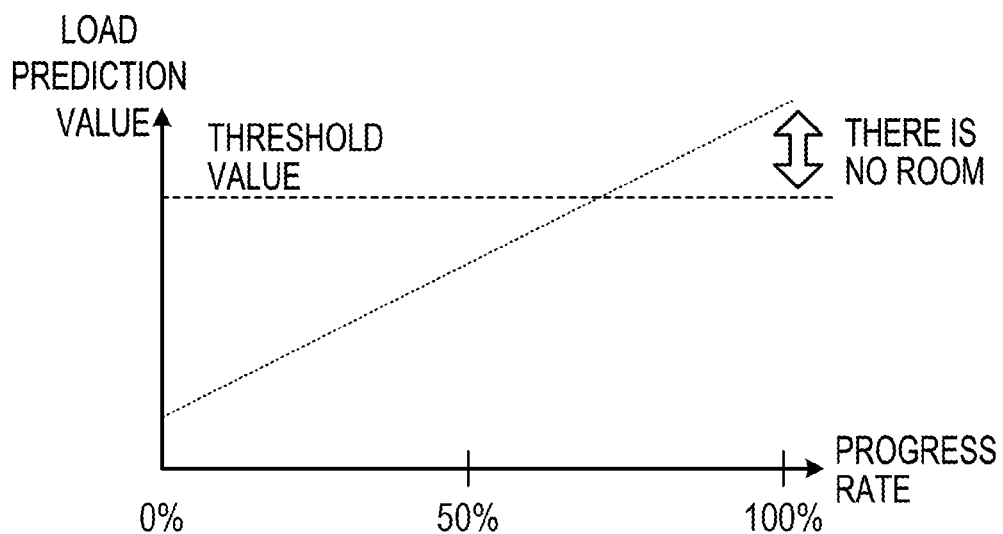
FIG. 7 is an explanatory view illustrating an example of a transition depending on the progress rate of the load prediction value that exceeds a load.
Figure 8:
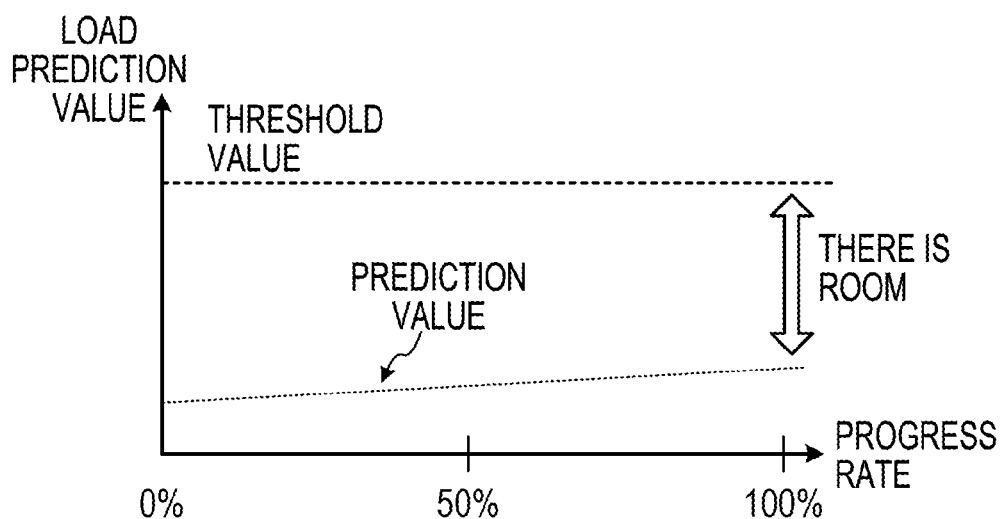
FIG. 8 is an explanatory view illustrating an example of a transition depending on the progress rate of a normal load prediction value.

The determination unit 22B determines whether the load prediction value exceeds a threshold value before the progress rate reaches 100%. The determination unit 22B determines whether a state in which the load prediction value exceeds the threshold value has continued for a predetermined time when the load prediction value exceeds the threshold value before the progress rate reaches 100%. FIG. 7 is an explanatory view illustrating an example of a transition depending on the progress rate of the load prediction value that exceeds a load. As illustrated in FIG. 7, when the load prediction value exceeds the threshold value before the progress rate reaches 100% and the state in which the load prediction value exceeds the threshold value has not continued for a predetermined time, the determination unit 22B notifies the change controller 23 and the dashboard 5 of an overload notification including the load prediction value. When the load prediction value exceeds the threshold value before the progress rate reaches 100% and the state in which the load prediction value exceeds the threshold value has continued for a predetermined time, the determination unit 22B notifies the change controller 23 and the dashboard 5 of a change cancel indicating the cancel of the change processing. FIG. 8 is an explanatory view illustrating an example of a transition depending on the progress rate of a normal load prediction value. As illustrated in FIG. 8, when the load prediction value does not exceed the threshold value before the progress rate reaches 100%, the determination unit 22B notifies the change controller 23 of a load notification including the load prediction value.

The change controller 23 includes an adjustment unit 23A and an instructing unit 23B. When detecting the change operation from the dashboard 5, the adjustment unit 23A identifies the change target components based on the change processing content corresponding to the change operation and the dependency information. Further, the adjustment unit 23A identifies the dependency source component that finally receives the influence of the change control from among the change target components, and notifies the identified dependency source component of the change instruction. Upon receiving the change instruction, the dependency source component executes the change processing in response to the change instruction. After executing the change processing for the dependency source component, the adjustment unit 23A notifies the next dependency source component among the change target components of the change instruction.

Upon receiving the overload notification from the determination unit 22A in the prediction unit 22, the adjustment unit 23A adjusts the transmission interval of the change instruction so that the transmission interval of the change instruction becomes longer based on the load prediction value in the overload notification and the current progress ratio. Further, upon receiving the load notification from the determination unit 22A, the adjustment unit 23A adjusts the transmission interval of the change instruction so that the transmission interval of the change instruction becomes shorter or maintains the current transmission interval based on the load prediction value in the load notification and the current progress rate. The adjustment unit 23A notifies the instructing unit 23B of the adjusted transmission interval or the currently maintained transmission interval.

The instructing unit 23B transmits a change instruction to a change target component that is yet to start the change processing at the transmission interval received from the adjustment unit 23A. As a result, each change target component in the distributed processing system 3 executes the change processing in response to the change instruction received from the change controller 23.

Figure 9:
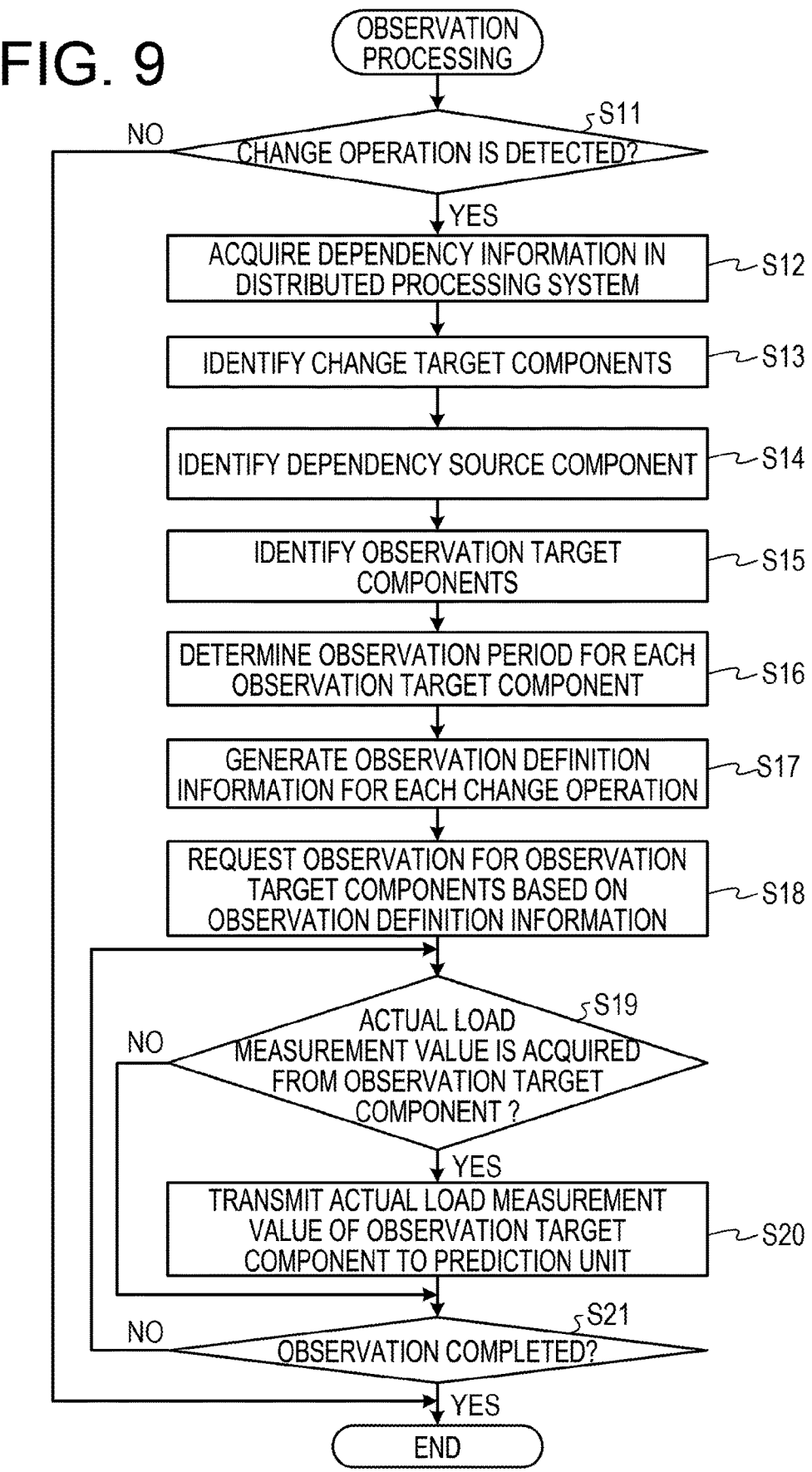
FIG. 9 is an explanatory view illustrating an example of a processing operation of an observation unit related to an observation processing.

Subsequently, descriptions will be made on the operation of the distributed system 1 according to the present embodiment. FIG. 9 is an explanatory view illustrating an example of a processing operation of the observation unit 21 related to an observation processing. In FIG. 9, the determination unit 21A in the observation unit 21 determines whether a change operation from the dashboard 5 has been detected (step S11). When it is determined that the change operation has been detected ("Yes" in step S11), the determination unit 21A acquires dependency information from the distributed processing system 3 (step S12). The dependency information is information representing the dependency relationship between each component 2 in the distributed processing system 3.

The determination unit 21A identifies change target components 2 in the distributed processing system 3 based on the change content of the change operation and the dependency information (step S13). Further, the determination unit 21A identifies a dependency source component that finally receives the influence of the change control from among the change target components (step S14). The determination unit 21A identifies the change target components as observation target components (step S15), and determines an observation period for each observation target component (step S16).

The determination unit 21A generates observation definition information for each change operation, which includes the change target components that are observation target components, the dependency source component, and the observation period for each observation target component (step S17). Based on the observation definition information, the load observation unit 21B notifies the distributed processing system 3 of the observation request that requests observation of the load amount of the observation target components (step S18). In addition, the distributed processing system 3 establishes an observation API in response to the observation request, and collects the load amounts of observation target components through the observation API for each observation period. The observation API notifies the load observation unit 21B of the load amount of each observation target component as an actual load measurement value.

The load observation unit 21B determines whether the actual load measurement value of the observation target component has been acquired from the observation API (step S19). When it is determined that the actual load measurement value of the observation target component has been acquired ("Yes" in step S19), the load observation unit 21B transmits the actual load measurement value of the observation target component to the prediction unit 22 (step S20). The load observation unit 21B determines whether the observation of the observation target components has been completed (step S21). When it is determined that the observation of the observation target components has been completed ("Yes" in step S21), the load observation unit 21B ends the processing operation illustrated in FIG. 9. When it is determined that the observation of the observation target components has not been completed ("No" in step S21), the load observation unit 21B proceeds to step S19 so as to monitor whether the actual load measurement value has been acquired. When it is determined that the actual load measurement value has not been acquired from the observation target component ("No" in step S19), the load observation unit 21B proceeds to step S21 so as to determine whether the observation has been completed. When the change operation has not been detected ("No" in step S11), the determination unit 21A ends the processing operation illustrated in FIG. 9.

Figure 10:
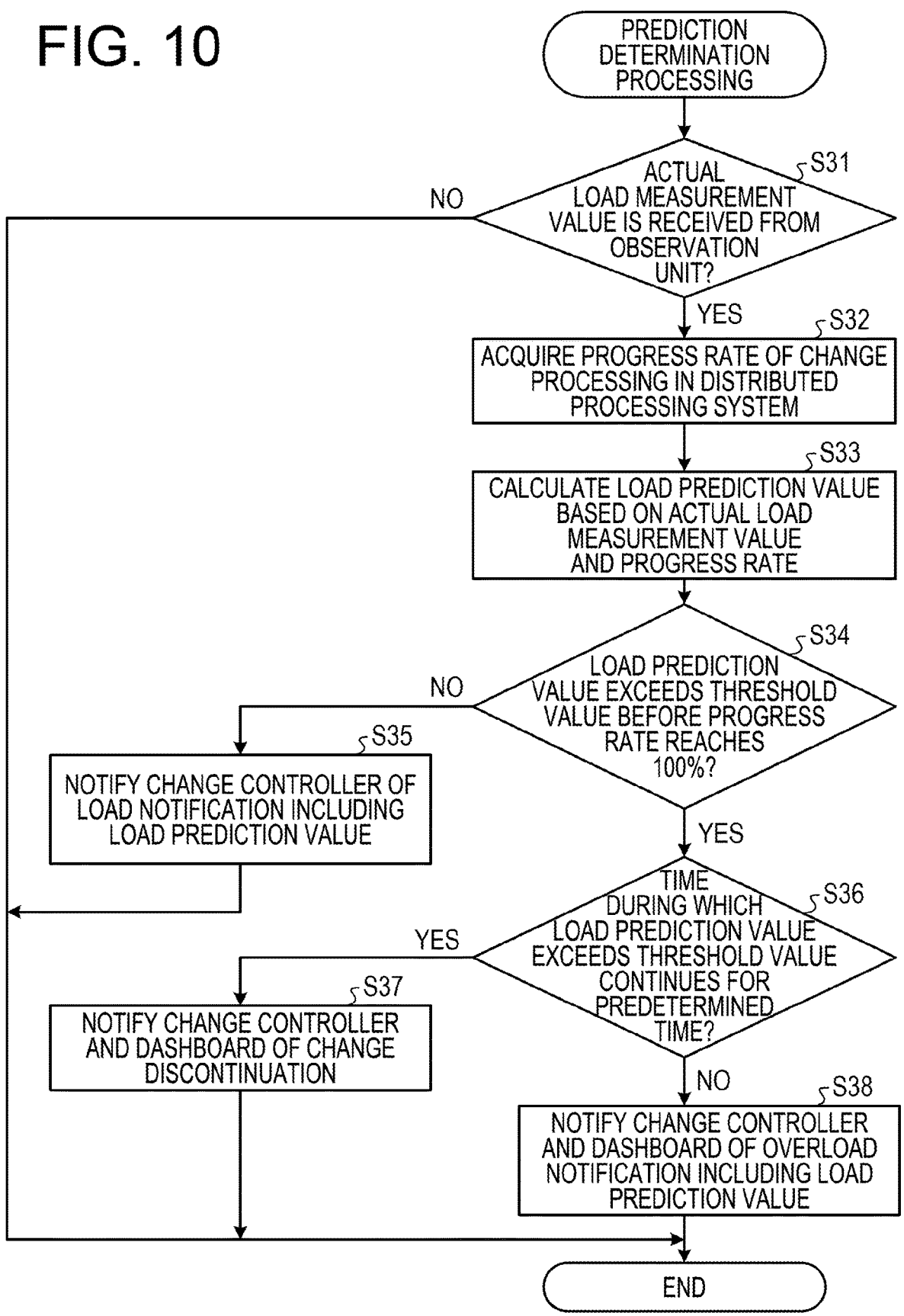
FIG. 10 is a flowchart illustrating an example of the processing operation of a prediction unit related to a prediction determination processing.

FIG. 10 is a flowchart illustrating an example of the processing operation of the prediction unit 22 related to a prediction determination processing. In FIG. 10, the calculation unit 22A in the prediction unit 22 determines whether the actual load measurement value has been received from the observation unit 21 (step S31). When it is determined that the actual load measurement value has been received ("Yes" in step S31), the calculation unit 22A acquires the progress rate of the change processing corresponding to the change operation from the distributed processing system 3 (step S32).

Based on the actual load measurement value and the progress rate, the calculation unit 22A calculates the transition of the load prediction value until the progress rate reaches 100%, that is, until the change processing is completed (step S33). The determination unit 22B in the prediction unit 22 determines whether the load prediction value exceeds the threshold value before the progress rate reaches 100% (step S34).

When it is determined that the load prediction value does not exceed the threshold value before the progress rate reaches 100% ("No" in step S34), the determination unit 22B notifies the change controller 23 of the load notification including the load prediction value (step S35) and ends the processing operation illustrated in FIG. 10.

When it is determined that the load prediction value exceeds the threshold value ("Yes" in step S34), the determination unit 22B determines whether the time during which the load prediction value exceeds the threshold value has continued for a predetermined time (step S36). When it is determined that the time during which the load prediction value exceeds the threshold value has continued for a predetermined time ("Yes" in step S36), the determination unit 22B notifies the change controller 23 and the dashboard 5 of a change cancel notification that instructs cancel of the change processing (step S37), and ends the processing operation illustrated in FIG. 10.

When it is determined that the time during which the load prediction value exceeds the threshold value has not continued for a predetermined time ("No" in step S36), the determination unit 22B notifies the change controller 23 and the dashboard 5 of the overload notification including the load prediction value (step S38), and ends the processing operation illustrated in FIG. 10. When the load actual measurement value has not been received from the observation unit ("No" in step S31), the calculation unit 21 ends the processing operation illustrated in FIG. 10.

Figure 11:
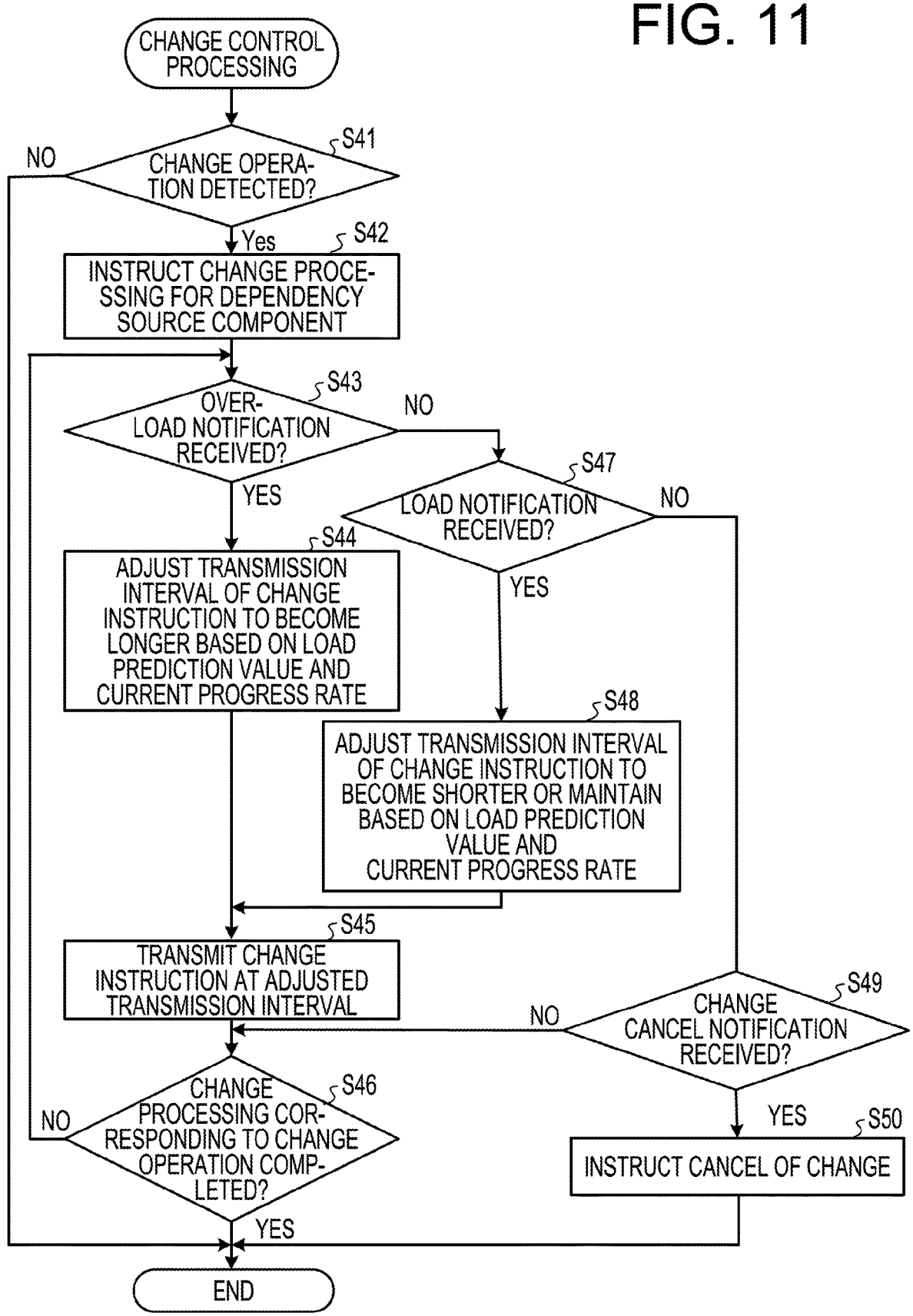
FIG. 11 is a flowchart illustrating an example of the processing operation of a change controller related to a change control processing.

FIG. 11 is a flowchart illustrating an example of the processing operation of the change controller 23 related to a change control processing. In FIG. 11, the adjustment unit 23A in the change controller 23 determines whether a change operation from the dashboard 5 has been detected (step S41). When it is determined that the change operation has been detected ("Yes" in step S41), the instructing unit 23B in the change controller 23 notifies the change instruction to instruct the change processing for the dependency source component (step S42). Also, the dependency source component executes the change processing in response to the change instruction.

The adjustment unit 23A determines whether the overload notification has been received from the prediction unit 22 (step S43). When it is determined that the overload notification has been received ("Yes" in step S43), the adjustment unit 23A adjusts the transmission interval of the change instruction instructing the change processing to become longer based on the load prediction value in the overload notification and the current progress rate (step S44). Further, when the transmission interval is extended, since the transmission interval of the change instruction to the component that is yet to start the change processing becomes longer, the load amount accompanied by the change processing becomes smaller.

The instructing unit 23B notifies the change instruction to the component that is yet to start the change processing at the adjusted transmission interval (step S45). Then, the instructing unit 23B determines whether the entire change processing corresponding to the change operation has been completed (step S46). When it is determined that the entire change processing corresponding to the change operation has been completed ("Yes" in step S46), the instructing unit 23B ends the processing operation illustrated in FIG. 11.

When it is determined that the entire change process corresponding to the change operation has not been completed ("No" in step S46), the instructing unit 23B proceeds to step S43 so as to determine whether the overload notification has been received. When it is determined that the change operation has not been detected ("No" in step S41), the adjustment unit 23A ends the processing illustrated in FIG. 11.

When it is determined that the overload notification has not been received ("No" in step S43), the adjustment unit 23A determines whether the load notification has been received from the observation unit 21 (step S47). When receiving the load notification ("Yes" in step S47), the adjustment unit 23A adjusts the transmission interval of the change instruction or maintains the current transmission interval so that the transmission interval of the change instruction becomes shorter based on the load prediction value in the load notification and the current progress rate. Then, the instructing unit 23B proceeds to step S45 so as to transmit the change instruction to the component that is yet to start the change processing at the adjusted or currently maintained transmission interval.

When it is determined that the load notification has not been received ("No" in step S47), the adjustment unit 23A determines whether a change cancel notification has been received (step S49). When it is determined that the change cancel notification has been received ("Yes" in step S49), the instructing unit 23B transmits a change cancel to the distributed processing system 3 (step S50), and ends the processing operation illustrated in FIG. 11. When it is determined that the change cancel notification has not been received ("No" in step S49), the change controller 23 proceeds to step S46 so as to determine whether the change processing corresponding to the change operation has been completed.

The information processing device 4 calculates a load prediction value until the change processing of all the change target components is completed based on the load actual measurement value of the change target component, and adjusts the transmission interval of the change instruction for the change target component that is yet to start the change processing when the load prediction value exceeds the threshold value. As a result, it is possible to suppress the load fluctuation related to the change processing.

The information processing device 4 preferentially instructs the change instruction to the dependency source component that uses the processing result from the change target component based on the dependency information. As a result, the change processing may be executed from the dependency source component having a large processing load in accordance with the change operation among the change target components.

The information processing device 4 calculates a load prediction value for each transmission interval until the change processing of all the change target components is completed, based on the actual load measurement value for each transmission interval of the change target component and the progress rate of the change processing of the change target component. As a result, the information processing device 4 may calculate the load prediction value for each transmission interval until the change processing is completed based on the actual load measurement value and the progress rate.

Even when a change operation to a large number of components under operation is detected, the information processing device 4 may minimize the load fluctuation of each component generated in response to the change operation, while executing the change processing of each component corresponding to the change operation.

Since the information processing device 4 dynamically adjusts the transmission interval at which the change instruction is transmitted based on the load prediction value, it is possible to implement a high-speed change processing for a large number of components.

The information processing device 4 sequentially executes the change processing on the change target component based on the load prediction value and the dependency relationship of the change target component. As a result, since the operation manager does not need to be aware of the processing state of the change target component, it is possible to implement the change processing for a large number of components.

Figure 12:
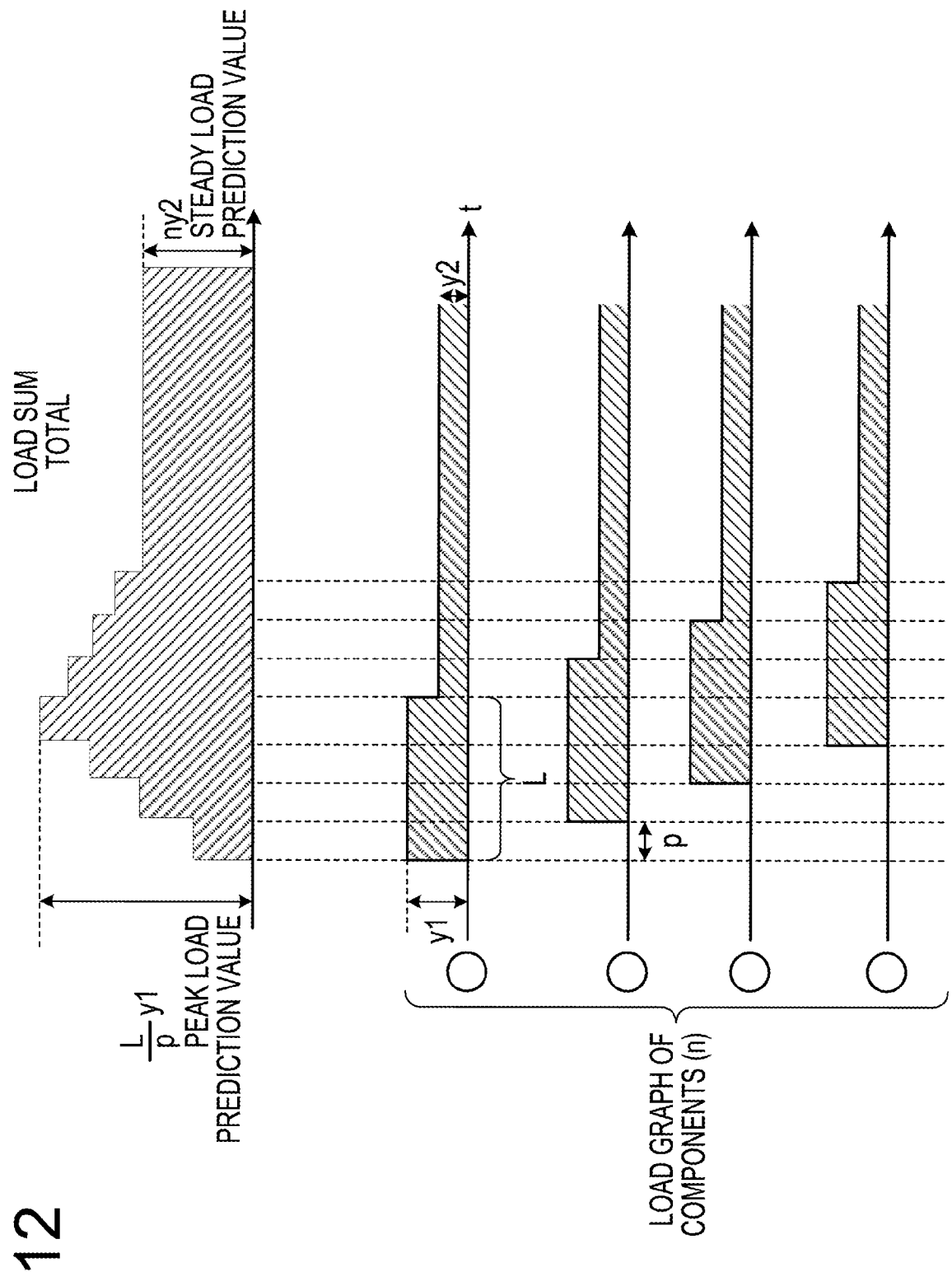
FIG. 12 is a flowchart illustrating an example of a threshold value determination method of the prediction unit.

Further, the prediction unit 22 of the above-described embodiment calculates the transition of the load prediction value until the progress rate reaches 100% based on the actual load measurement value of the change target component from the observation unit 21 and the current progress rate from the distributed processing system 3 so as to determine whether the load prediction value exceeds the threshold value. Therefore, an example of the threshold value determination method of the prediction unit 22 will be described in detail. FIG. 12 is a flowchart illustrating an example of a threshold value determination method of the prediction unit 22.

The observation unit 21 observes the actual load measurement value during the change processing for each transmission interval and the actual load measurement value after the change processing, as the actual load measurement value of the change target component. The actual load measurement value during the change processing is the actual load measurement value including a temporary load during execution of the change processing. The actual load measurement value after the change processing is the actual load measurement value which is a steady load after execution of the change processing.

The prediction unit 22 estimates the temporary load, that is, a duration L during which the change processing is being performed, based on an actual load measurement value y1 during the change processing for each transmission interval p and an actual load measurement value y2 after the change processing for each transmission interval. The prediction unit 22 calculates a peak load prediction value with $L \times y1 \div p$ based on the actual load measurement value y1, the transmission interval p, and the duration L. Further, the prediction unit 22 calculates a steady load prediction value with the number of components $n \times y2$. When estimating the actual load measurement value y1 during the change processing for each observation target component, the actual load measurement value y2 after the change processing, and the duration L, the prediction unit 22 may estimate such values from an average value of the actual load measurement values y1 of all observation target components, an average value of the actual load measurement values y2, and an average value of the durations L.

Figure 13:
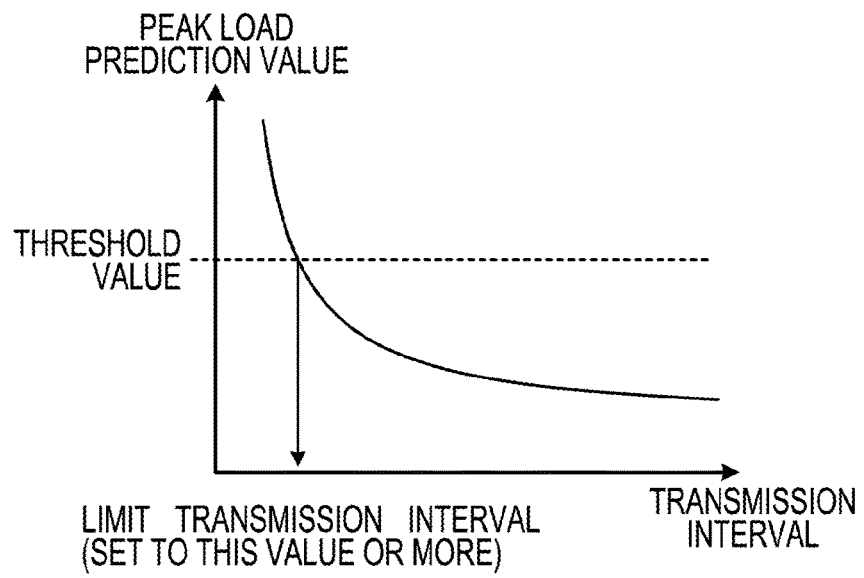
FIG. 13 is an explanatory view illustrating an example of a correspondence relationship between a peak load prediction value and a transmission interval.

When the peak load prediction value exceeds the threshold value and the time during which the peak load prediction value exceeds the threshold value has not continued for the predetermined time, the prediction unit 22 notifies the change controller 23 of the overload notification including the peak load prediction value. FIG. 13 is an explanatory view illustrating an example of a correspondence relationship between the peak load prediction value and the transmission interval. As illustrated in FIG. 13, the change controller 23 adjusts the transmission interval so that the peak load prediction value is equal to or less than the threshold value.

Figure 14:
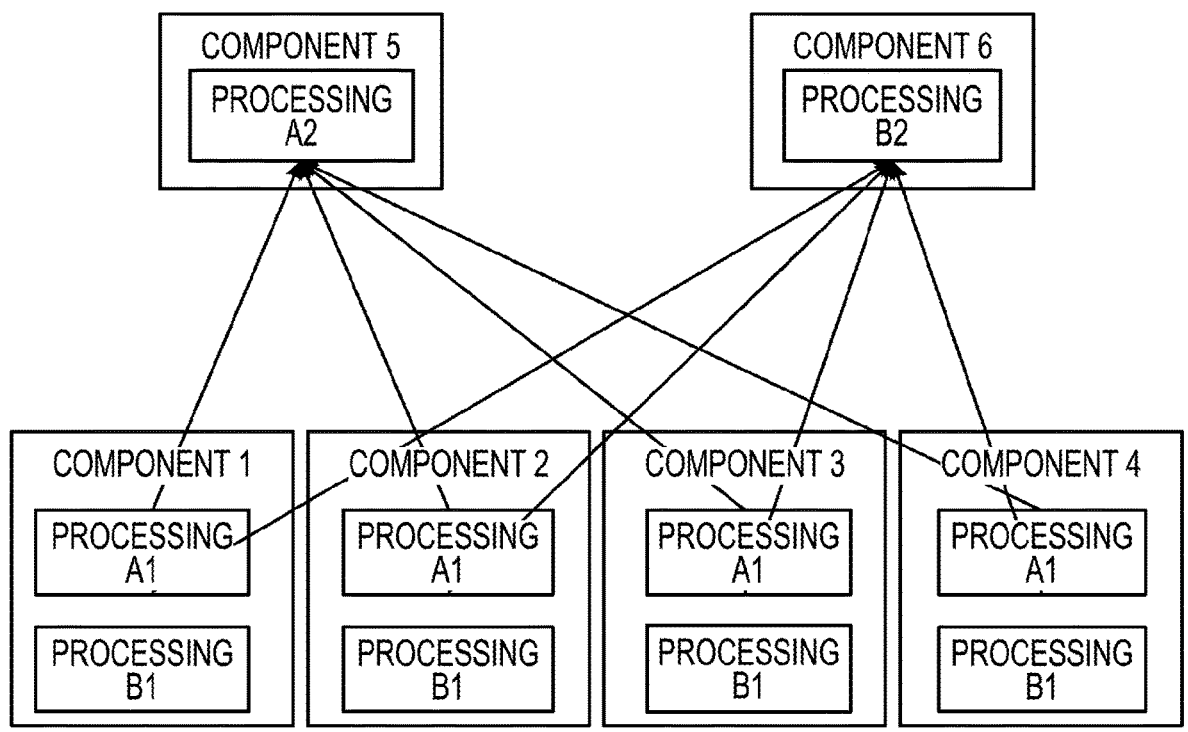
FIG. 14 is an explanatory view illustrating an example of a change target component when a change operation of a process addition is detected.

In the distributed processing system of the above-described embodiment, the load observation of the change target component is executed on a component basis, but may be executed in units of processing executed within the component or may be changed as appropriate. FIG. 14 is an explanatory view illustrating an example of the change target component when a change operation of a process addition is detected. For the sake of convenience of explanation, when a change operation of adding a processing A and a processing B is detected, a processing A1 and a processing B1 are added to components "1" to "4" as the dependency destination components. Further, it is assumed that the dependency source component of a processing A2 which depends on the processing A1 is a component "5", and the dependency source component of a processing B2 which depends on a processing B1 is a component "6".

When the change operation of the processing A is detected, since the change target components are "1", "2", "3", "4", and "5" based on the dependency relationship, the observation unit 21 observes the actual load measurement values of these change target components. Also, when the change operation of the processing B is detected, since the change target components are "1", "2", "3", "4", and "6" based on the dependency relationship, the observation unit 21 observes the actual load measurement values of these change target components.

Figure 15:
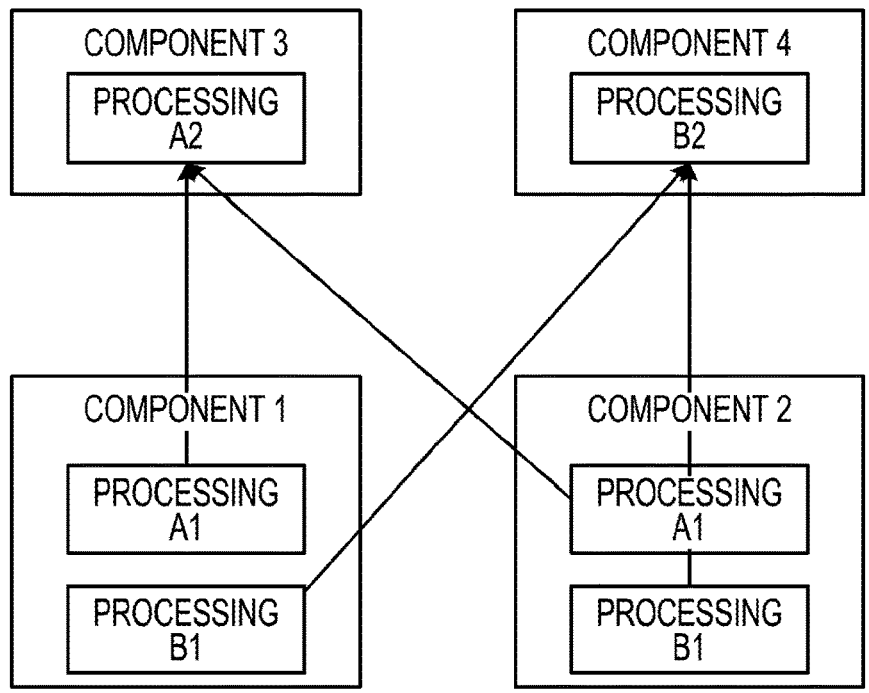
FIG. 15 is an explanatory view illustrating an example of a case where a change processing does not depend on each other.

When the change processing does not depend on with each other, the information processing device 4 independently executes a simultaneous parallel processing. FIG. 15 is an explanatory diagram illustrating an example in a case where the change processing does not depend on each other.

The dependency relationship illustrated in FIG. 15 has, for example, the components "1" to "4", and the processing A1 of the component "1" is a dependency destination of the processing A2 of the component "3", and the processing B1 of the component "1" is a dependency destination of the processing B2 of the component "4". Further, the processing A1 of the component "2" is a dependency destination of the processing A2 of the component "3", and the processing B1 of the component "2" is a dependency destination of the processing B2 of the component "4".

It is assumed that when the change processing does not depend on with each other, the information processing device 4 executes a change processing of the processing A1 and the processing A2 which corresponds to the change operation of the processing A1 and the processing A2, and a change processing of the processing B1 and the processing B2 which corresponds to the change operation of the processing B1 and the processing B2 in a simultaneous parallel manner.

Figure 16:
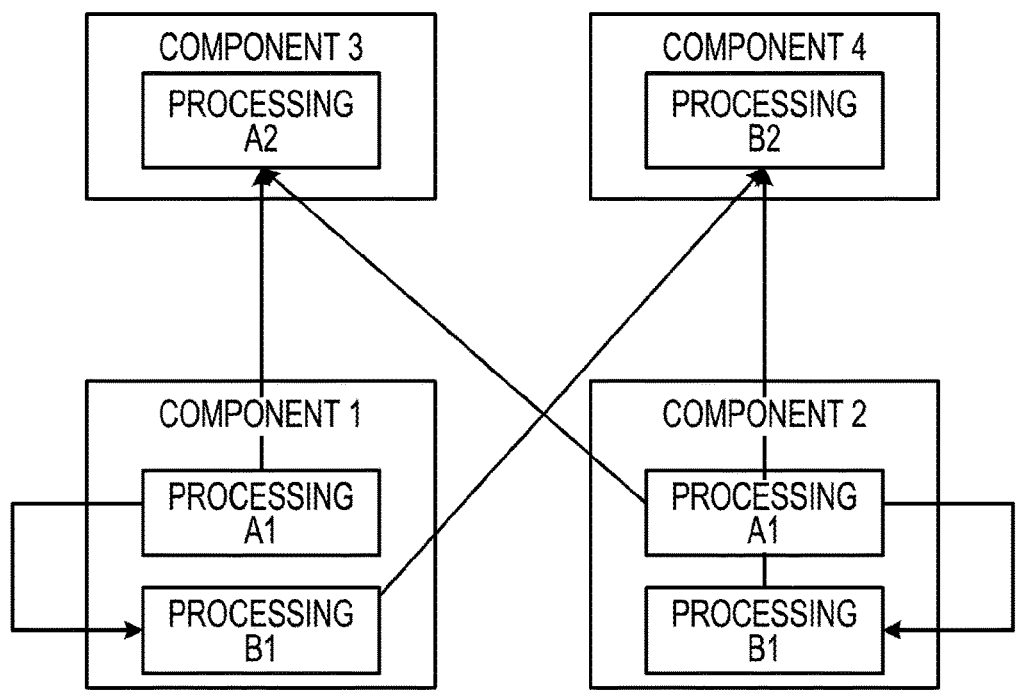
FIG. 16 is an explanatory view illustrating an example of a case where the change processing depends on each other.

When the change processing depends on with each other, the information processing device 4 executes, for example, one change processing after executing the other change processing. FIG. 16 is an explanatory view illustrating an example of a case where the change processing depends on each other.

The dependency relationship illustrated in FIG. 16 has, for example, the components "1" to "4", and the processing A1 of the component "1" is a dependency destination of the processing A2 of the component "3" and the processing A1 of the component "1" is a dependency destination of the processing B1 in the component "1". Further, the processing B1 of the component "1" is a dependency destination of the processing B2 in the component "4".

The processing A1 of the component "2" is a dependency destination of the processing A2 of the component "3" and the processing B1 in the component "2". Further, the processing B1 of the component "2" is a dependency destination of the processing B2 in the component "4".

It is assumed that when the change processing depends on with each other, for example, the information processing device 4 executes the change processing of the processing B1 and the processing B2 corresponding to the change operation of the processing B1 and the processing B2, after executing the change processing of the processing A1 and the processing A2 corresponding to the change operation of the processing A1 and the processing A2.

When detecting the change operation, the information processing device 4 identifies the dependency source component of the change processing from the dependency relationship of the processing corresponding to the change operation so as to preferentially start the change processing from the dependency source component. The information processing device 4 sequentially executes the change processing for the change target component that is yet to start the change processing after the change processing of the dependency source component. At this time, the information processing device 4 dynamically adjusts the transmission interval of the change instruction based on the load prediction value of the observation target component.

Further, the information processing device 4 of the above-described embodiment dynamically adjusts the transmission interval of the change instruction in accordance with the load prediction value of the observation target component. However, in addition to the transmission interval, the execution order of the change processing for the change target component that is yet to start the change processing may be dynamically adjusted or may be changed as appropriate.

The information processing device 4 may sequentially execute the change processing for the change target component arranged in other resources, for example, so as not to bias the load on the physical resource. The information processing device 4 may manage the load occurrence record at the time of past change and may sequentially execute the change processing for the change target component based on the load occurrence record. The information processing device 4 may sequentially execute the change processing for the change target component based on the state value of each component.

Further, the change controller 23 dynamically adjusts the transmission interval for the change target component based on the load prediction value. However, not only the transmission interval may be dynamically adjusted, but also the order of the change instruction to the change target component may be dynamically changed or may be changed as appropriate.

When receiving the overload notification, the change controller 23 adjusts the transmission interval of the change instruction to become longer based on the load prediction value in the overload notification and the current progress rate, but the change controller 23 is not limited to this. For example, when the overload notification is received, the change controller 23 may instruct to cancel the change processing or may be changed as appropriate. Further, when receiving the overload notification from the prediction unit 22, the dashboard 5 may notify the cancel of the change processing.

The threshold value used by the determination unit 22B is set to a preset fixed value, but may be changed dynamically or properly, for example, in a load amount of the entire distributed system 1 or a physical resource situation. Further, the threshold value may be set to a different threshold value for each component.

The respective components of each unit illustrated in the drawings are not necessarily physically configured as illustrated in the drawings. That is, the specific forms of distribution and integration of the respective units are not limited to those illustrated in the drawings, but all or a portion thereof may be distributed or integrated functionally or physically in arbitrary units depending on various loads, usage situations, or the like.

Furthermore, all or an arbitrary portion of various processing functions performed by the respective devices may be executed on a central processing unit (CPU) (or a microcomputer such as a micro processing unit (MPU) and a micro controller unit (MCU)). Further, it is needless to say that all or an arbitrary portion of the various processing functions may be executed on a program analyzed and executed by a CPU (or a microcomputer such as an MPU and an MCU), or hardware by a wired logic.

Figure 17:
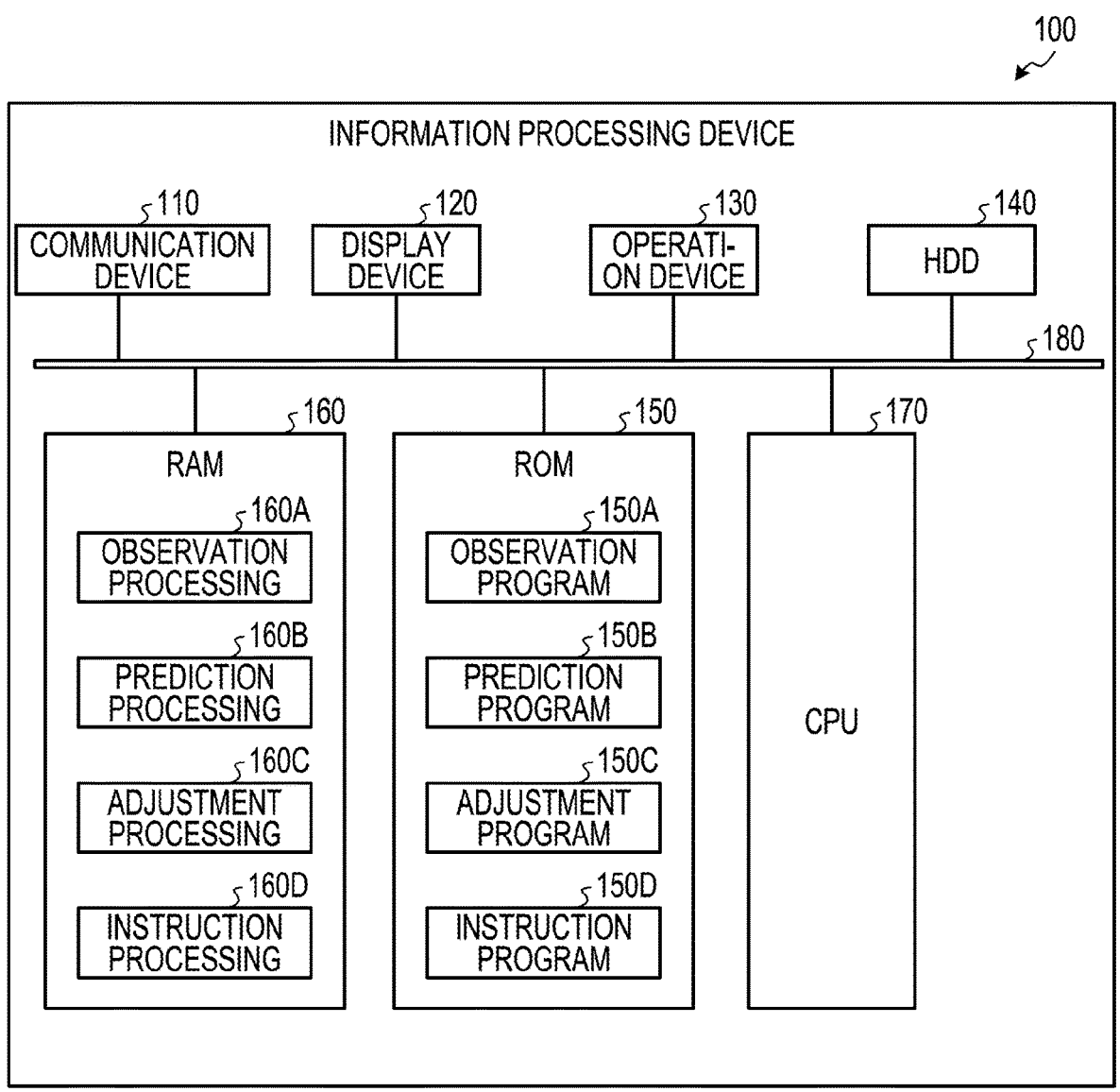
FIG. 17 is an explanatory view illustrating an example of the information processing device that executes a change control program.
Figure 18:
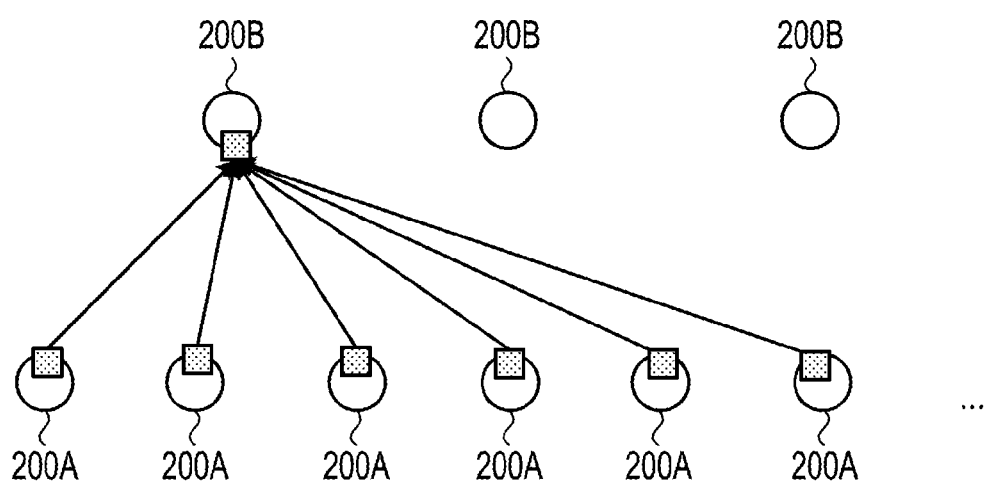
FIG. 18 is an explanatory view illustrating an example of a component dependency relationship.

The various processings described in the present embodiment are implemented by executing a program prepared in advance in the information processing device. Therefore, hereinafter, descriptions will be made on an example of the information processing device that executes a program having the same functions as those of the above-described embodiment. FIG. 17 is an explanatory view illustrating an example of the information processing device that executes a change control program.

The information processing device 100 that executes the change control program illustrated in FIG. 17 includes a communication device 110, a display device 120, an operation device 130, an HDD 140, a ROM 150, a RAM 160, a CPU 170, and a bus 180.

In the ROM 150, a change control program that exhibits the similar functions to those of the above-described embodiment is stored in advance. The change control program may not necessarily be stored in the ROM 150 from the beginning, and may be recorded on a recording medium readable by a drive (not illustrated). The recording medium may be, for example, a flexible disk (FD), a CD-ROM, a DVD disk, a USB memory, a portable recording medium such as an SD card or an IC card, or a semiconductor memory such as a flash memory. The information processing device 100 may read and execute the change control program stored in the recording medium. The change control program includes an observation program 150A, a prediction program 150B, an adjustment program 150C, and an instruction program 150D as illustrated in FIG. 17. The programs 150A to 150D may be appropriately integrated or distributed.

The CPU 170 reads these programs 150A to 150D from the ROM 150 and loads each of these read programs onto the work area of the RAM 160. Then, the RAM 160 functions as an observation processing 160A, a prediction processing 160B, an adjustment processing 160C, and an instruction processing 160D for each of the loaded programs 150A to 150D.

The CPU 170 observes the actual load measurement values of the change target components that depend on each other among the plurality of components arranged on the distributed processing system. The CPU 170 calculates load prediction values until completion of the change processing of all the change target components, based on the load actual measurement values of the change target components. The CPU 170 adjusts the transmission interval of the change instruction that instructs the start of the change processing to the change target component that is yet to start the change processing when the load prediction value exceeds the threshold value. The CPU 170 transmits a change instruction to the change target component that is yet to start the change processing based on the adjusted transmission interval. As a result, it is possible to suppress the load fluctuation related to the change processing.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiments of the present disclosure have been described in detail, it should be understood that the various changes, substitutions, and alterations could be made hereto without departing from the spirit and scope of the disclosure.

What is claimed is:

1. An information processing device comprising:
    a memory; and
    a processor coupled to the memory and the processor configured to:
        observe an actual load measurement value of each of change target components among a plurality of components arranged in a distributed processing system, each of the change target components having a communication connection for transmitting or receiving data of a processing result with another component;
        calculate a load prediction value of each of the change target components until completion of a change processing of all of the change target components based on the actual load measurement value of each of the change target components;
        adjust a transmission interval of a change instruction for instructing start of the change processing to each unchanged change target component that has not started the change processing when the load prediction value exceeds a predetermined threshold value;
        transmit the change instruction to each unchanged change target component that has not started the change processing at the adjusted transmission interval;
        calculate a steady load prediction value and a peak load prediction value of the change target components based on the actual load measurement value of each of the change target components at each transmission interval and a state of progress in the change processing of the change target components, wherein the steady load prediction value is a predicted value of the change target components after completion of the change processing of all change target components, and the peak load prediction value is a maximum predicted value of the change target components during the change processing at each transmission interval until the completion of the change processing of all change target components; and
        adjust the transmission interval of the change instruction for each unchanged change target component that has not started the change processing such that the peak load prediction value does not exceed the predetermined threshold value.

2. The information processing device according to claim 1, wherein the processor is further configured to:
    identify, upon detecting a change operation of changing a processing in the plurality of components, change target components in which a processing is to be changed;
    identify, based on the communication connection, a dependency source component that finally uses processing results of other components from among the change target components; and
    preferentially transmit the change instruction to the dependency source component.

3. The information processing device according to claim 1, wherein the processor is further configured to:
    identify, upon detecting a change operation of changing a processing in the plurality of components, change target components in which a processing is to be changed; and
    observe the actual load measurement value of the identified change target components.

4. The information processing device according to claim 1, wherein the processor is further configured to:
    calculate the load prediction value of the change target components at each transmission interval until completion of the change processing of all change target components based on the actual load measurement value of each of the change target components at each transmission interval and a state of progress in the change processing of the change target components.

5. The information processing device according to claim 1, wherein the processor is further configured to:
    output a cancel of the change processing for the change target components when a time during which the load prediction value exceeds the predetermined threshold value has continued for a predetermine time.

6. The information processing device according to claim 1, wherein the processor is further configured to:
transmit the change instruction to each unchanged change target component that has not started the change processing in an order based on the communication connection.

7. The information processing device according to claim 1, wherein the transmission interval of the change instruction when the load prediction value exceeds the predetermined threshold value is adjusted to become longer than a transmission interval of the change instruction when the load prediction value is the predetermined threshold value or less.

8. The information processing device according to claim 1, wherein the load prediction value is calculated until the completion of the change processing of all of the change target components to form a transition line of the load prediction value.

9. The information processing device according to claim 1, wherein the processor is further configured to shorten or maintain the transmission interval of the change instruction when the load prediction value is equal to or smaller than the predetermined threshold value.

10. The information processing device according to claim 1, wherein the change instruction is transmitted to each unchanged change target component during performing the change processing of at least one of the change target components that has started the change processing.

11. A distributed system comprising:
a distributed processing system in which a plurality of components are arranged;
and an information processing device including:
a memory; and
a processor coupled to the memory and the processor configured to:
observe an actual load measurement value of each of change target components among the plurality of components, each of the change target components having a communication connection for transmitting or receiving data of a processing result with another component;
calculate a load prediction value of each of the change target components until completion of a change processing of all of the change target components based on the actual load measurement value of each of the change target components;
adjust a transmission interval of a change instruction for instructing start of the change processing to each unchanged change target component that has not started the change processing when the load prediction value exceeds a predetermined threshold value;
transmit the change instruction to each unchanged change target component that has not started the change processing at the adjusted transmission interval;
calculate a steady load prediction value and a peak load prediction value of the change target components based on the actual load measurement value of each of the change target components at each transmission interval and a state of progress in the change processing of the change target components, wherein the steady load prediction value is a predicted value of the change target components after completion of the change processing of all change target components, and the peak load prediction value is a maximum predicted value of the change target components during the change processing at each transmission interval until the completion of the change processing of all change target components; and
adjust the transmission interval of the change instruction for each unchanged change target component that has not started the change processing such that the peak load prediction value does not exceed the predetermined threshold value.

12. The distributed system according to claim 11, wherein the processor is further configured to shorten or maintain the transmission interval of the change instruction when the load prediction value is equal to or smaller than the predetermined threshold value.

13. The distributed system according to claim 11, wherein the change instruction is transmitted to each unchanged change target component during performing the change processing of at least one of the change target components that has started the change processing.

14. A non-transitory computer-readable recording medium having stored therein a program that causes a computer to execute a process, the process comprising:
observing an actual load measurement value of each of change target components among a plurality of components arranged in a distributed processing system, each of the change target components having a communication connection for transmitting or receiving data of a processing result with another component;
calculating a load prediction value of each of the change target components until completion of a change processing of all of the change target components based on the actual load measurement value of each of the change target components;
adjusting a transmission interval of a change instruction for instructing start of the change processing to each unchanged change target component that has not started the change processing when the load prediction value exceeds a predetermined threshold value;
transmitting the change instruction to each unchanged change target component that has not started the change processing at the adjusted transmission interval;
calculating a steady load prediction value and a peak load prediction value of the change target components based on the actual load measurement value of each of the change target components at each transmission interval and a state of progress in the change processing of the change target components, wherein the steady load prediction value is a predicted value of the change target components after completion of the change processing of all change target components, and the peak load prediction value is a maximum predicted value of the change target components during the change processing at each transmission interval until the completion of the change processing of all change target components; and
adjusting the transmission interval of the change instruction for each unchanged change target component that has not started the change processing such that the peak load prediction value does not exceed the predetermined threshold value.

15. The non-transitory computer-readable recording medium according to claim 14, wherein in the adjusting, the transmission interval of the change instruction is shortened or maintained when the load prediction value is equal to or smaller than the predetermined threshold value.

16. The non-transitory computer-readable recording medium according to claim 9, wherein the change instruction is transmitted to each unchanged change target component during performing the change processing of at least one of the change target components that has started the change processing.

* * * * *